United States Patent
Talreja et al.

(10) Patent No.: US 11,174,408 B2
(45) Date of Patent: Nov. 16, 2021

(54) PEROXIDE-CURABLE POLYOLEFIN COMPOSITION

(71) Applicant: Dow Global Technologies LLC, Midland, MI (US)

(72) Inventors: Manish Talreja, Lansdale, PA (US); Jeffrey M. Cogen, Flemington, NJ (US)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 249 days.

(21) Appl. No.: 16/462,347

(22) PCT Filed: Nov. 27, 2017

(86) PCT No.: PCT/US2017/063219
§ 371 (c)(1),
(2) Date: May 20, 2019

(87) PCT Pub. No.: WO2018/102242
PCT Pub. Date: Jun. 7, 2018

(65) Prior Publication Data
US 2019/0270905 A1    Sep. 5, 2019

Related U.S. Application Data

(60) Provisional application No. 62/428,578, filed on Dec. 1, 2016.

(51) Int. Cl.
| | | |
|---|---|---|
| C09D 123/06 | (2006.01) | |
| C09D 7/63 | (2018.01) | |
| C08F 110/02 | (2006.01) | |
| C08J 3/24 | (2006.01) | |
| C08K 5/11 | (2006.01) | |
| C08K 5/3492 | (2006.01) | |
| C08K 5/378 | (2006.01) | |
| C09D 5/00 | (2006.01) | |
| H01B 3/44 | (2006.01) | |
| H01B 7/28 | (2006.01) | |
| H01B 7/295 | (2006.01) | |
| C08K 5/372 | (2006.01) | |
| C08K 5/14 | (2006.01) | |

(52) U.S. Cl.
CPC .......... *C09D 123/06* (2013.01); *C08F 110/02* (2013.01); *C08J 3/24* (2013.01); *C08K 5/11* (2013.01); *C08K 5/14* (2013.01); *C08K 5/34924* (2013.01); *C08K 5/378* (2013.01); *C08K 5/3725* (2013.01); *C09D 5/00* (2013.01); *C09D 7/63* (2018.01); *H01B 3/441* (2013.01); *H01B 7/2813* (2013.01); *H01B 7/295* (2013.01); *C08F 2810/20* (2013.01); *C08K 2201/014* (2013.01)

(58) Field of Classification Search
USPC ..................... 523/173; 524/101; 174/121 SR
See application file for complete search history.

(56) References Cited

U.S. PATENT DOCUMENTS

| | | | |
|---|---|---|---|
| 6,187,847 | B1 | 2/2001 | Cogen et al. |
| 6,656,986 | B2 | 12/2003 | Caronia et al. |
| 8,455,580 | B2 | 6/2013 | Sengupta et al. |
| 8,808,968 | B2 | 8/2014 | Choi et al. |
| 9,329,480 | B2 | 5/2016 | Choi et al. |
| 9,403,933 | B2 | 8/2016 | Ristoski et al. |
| 2010/0276057 | A1 | 11/2010 | Albrecht et al. |
| 2012/0329353 | A1 | 12/2012 | Davis et al. |

FOREIGN PATENT DOCUMENTS

| | | |
|---|---|---|
| JP | 56141338 | 11/1981 |
| JP | 63264807 | 11/1988 |
| JP | 11265617 | 9/1999 |
| JP | 2000306433 | 11/2000 |
| WO | 2014096951 A2 | 6/2014 |
| WO | 2014204944 | 12/2014 |

OTHER PUBLICATIONS

Machine translation of Detailed Description of JP S56141338A; retrieved from ESPACENET on Mar. 21, 2021 (Year: 1981).*
Technical Information, Plastic Additives: Irganox565, BASF Schweiz AG (2 pages), Sep. 2010 (Year: 2010).*
Mayzo, BNX 565 Multifunctional Antioxidant and Thermal Stabilizer, BNX 565 Product Data Sheet, 2015.

* cited by examiner

*Primary Examiner* — Fred M Teskin

(57) ABSTRACT

A peroxide-curable polyolefin composition comprising a peroxide-curable polyolefin prepolymer, an organic peroxide, and 4-[[4,6-bis(octylthio)-1,3,5-triazin-2-yl]amino]-2,6-bis(1,1-dimethylethyl)-phenol. Also, a peroxide-cured polyolefin product prepared therefrom, methods of making and using same, and articles containing or made from same.

9 Claims, No Drawings

PEROXIDE-CURABLE POLYOLEFIN COMPOSITION

FIELD

The field includes a peroxide-curable polyolefin composition, a peroxide-cured polyolefin product prepared therefrom, methods of making and using same, and articles containing or made from same.

INTRODUCTION

Various types of curable polymer compositions are mentioned in U.S. Pat. Nos. 6,187,847; 6,656,986; 8,808,968 B2; U.S. Pat. No. 8,455,580 B2; U.S. Pat. No. 9,403,933 B2; U.S. Pat. No. 9,329,480 B2; US 2010/0276057; US 2012/0329353; WO 2014/096951; and WO 2014/204944.

SUMMARY

Compositions containing peroxides and sulfur-based antioxidants are known to suffer from instability problems. Amines are added to such compositions to decrease or prevent such instability. We unexpectedly found peroxide-curable polyolefin compositions containing sulfur-based antioxidants, peroxides, and amines that suffer from peroxide instability problems. These problem compositions contain a peroxide-curable polyolefin resin, an organic peroxide, and either: (a) a combination of antioxidants CYANOX 1790 (tris[(4-tert-butyl-3-hydroxy-2,6-dimethylphenyl)methyl]-1,3,5-triazine-2,4,6-trione) and DSTDP (distearyl thiodipropionate) and NAUGARD 445 (bis(4-(1-methyl-1-phenylethyl)phenyl)amine) or (b) a combination of antioxidant LOWINOX TBP-6 (2,2'-thiobis(6-t-butyl-4-methylphenol) and the HALS (hindered amine light stabilizer) LOWILITE 62 (butanedioic acid dimethyl ester, polymer with 4-hydroxy-2,2,6,6-tetramethyl-1-piperidine-ethanol). It would make scientific sense to look for new peroxide-curable polyolefin compositions that have the antioxidizing properties of the problem compositions but avoid the combination of additives found in (a) or (b). A problem, then, would be to formulate a new peroxide-curable polyolefin that contains a peroxide-curable polyolefin resin, an organic peroxide, and one or more antioxidants, and optionally a HALS, that contains combinations of functional groups found in (a) or (b) and has robust peroxide stability.

Our technical solution to this problem includes a new peroxide-curable polyolefin composition that has antioxidizing properties and does not suffer from peroxide instability. The peroxide-curable polyolefin composition comprises a peroxide-curable polyolefin resin, an organic peroxide, and 4-[[4,6-bis(octylthio)-1,3,5-triazin-2-yl]amino]-2,6-bis(1,1-dimethylethyl)-phenol ("BOTAP"). Also provided are a peroxide-cured polyolefin product prepared therefrom, methods of making and using same, and articles containing or made from same. The antioxidant BOTAP contains many of the same functional groups found divided between the components of (a) or (b), albeit in a same molecule. This fact makes acutely surprising the robust peroxide stability of the inventive composition and product.

DETAILED DESCRIPTION

The Summary and Abstract are incorporated here by reference. Examples of inventive embodiments include the following numbered aspects.

Aspect 1. A peroxide-curable polyolefin composition comprising constituents (A) to (C): (A) a peroxide-curable polyolefin resin, (B) an organic peroxide, and (C) 4-[[4,6-bis(octylthio)-1,3,5-triazin-2-yl]amino]-2,6-bis(1,1-dimethylethyl)-phenol ("BOTAP"); wherein the peroxide-curable polyolefin composition contains from 95.0 to 99.70 weight percent (wt %) of (A), from 0.20 to 2.5 wt % of (B), and from 0.01 to 0.50 wt % of (C), all wt % based on total weight of the peroxide-curable polyolefin composition. When a sum of the wt % of constituents (A) to (C) is less than 100.00 wt %, the peroxide-curable polyolefin composition further contains at least one additional constituent, such as constituents (D) to (K) described later.

Aspect 2. The peroxide-curable polyolefin composition of aspect 1 wherein the (A) peroxide-curable polyolefin resin is (i) a peroxide-curable polyethylene resin ("pcPE"); or (ii) a pcPE that is a peroxide-curable low density polyethylene resin ("pcLDPE"); or (iii) a pcPE that is a peroxide-curable high density polyethylene resin ("pcHDPE"); or (iv) a pcPE that is a mixture of an ethylene ($C_1$-$C_4$)alkyl acrylate copolymer (EAA) and a peroxide-curable polyethylene ("pcPE"); or (v) a pcPE that is a pcLDPE characterized by a melt index (190° C., 2.16 kg), "$I_2$", of from 0.5 to 3.0 grams per 10 minutes (g/10 min., e.g., 2.1 g/10 min.) and a density of 0.90 to 0.95 grams per cubic centimeter (g/cm$^3$, e.g., 0.92 g/cm$^3$); or (vi) a combination of any two or more of (i) to (iv). In some aspects the $I_2$ is from 1.0 to 2.9 g/10 min., alternatively 1.5 to 2.6 g/10 min., alternatively 2.0 to 2.5 g/10 min.

Aspect 3. The peroxide-curable polyolefin composition of aspect 1 or 2 wherein the (B) organic peroxide is dicumyl peroxide.

Aspect 4. The peroxide-curable polyolefin composition of any one of aspects 1 to 3 wherein (i) the (B) organic peroxide is from 0.20 to 2.10 wt %; or (ii) the (B) organic peroxide is from 0.30 to 2.00 wt %, alternatively from 0.50 to 2.00 wt %; or (iii) the (C) BOTAP is from 0.015 to 0.50 wt %; or (iv) the (C) BOTAP is from 0.05 to 0.42 wt %; or (v) or a combination of either (i) and (iii), (i) and (iv), (ii) and (iii), or (ii) and (iv); wherein all wt % based on total weight of the peroxide-curable polyolefin composition.

Aspect 5. The peroxide-curable polyolefin composition of any one of aspects 1 to 4 further comprising (i) at least one (D) ($H_2C=C(H)(CH_2)_b$-functional) coagent, wherein subscript b is an integer from 0 to 2; or (ii) at least one (E) second antioxidant; or (iii) (F) a hindered amine light stabilizer ("HALS"); or (iv) (G) a flame retardant; or (v) (H) a water tree retardant or electrical tree retardant; or (vi) (I) a colorant; or (vii) (J) a methyl radical scavenger; or (viii) (K) a liquid aromatic or saturated hydrocarbon (LASH); or (ix) a combination of (i) and (ii); or (x) a combination of (i), (ii), and at least one of (iii) to (viii); or (xi) a combination of (i), (ii), (iii), and optionally 0 to 2 of (iv) to (viii); all wherein the combined weight of the (D) to (K) is from >0 to 4.69 wt % of the total weight of the peroxide-curable polyolefin composition.

Aspect 6. The peroxide-curable polyolefin composition of aspect 5 wherein: (i) the at least one (D) ($H_2C=C(H)(CH_2)_b$-functional) coagent is alpha-methylstyrene dimer ("AMSD") or a multi($H_2C=C(H)(CH_2)_b$-functional) coagent having two or three ($H_2C=C(H)(CH_2)_b$— groups, wherein subscript b is as defined above or below; or (ii) the at least one (E) second antioxidant is absent; tris[(4-tert-butyl-3-hydroxy-2,6-dimethylphenyl)methyl]-1,3,5-triazine-2,4,6-trione; or 4,4'-thiobis(2-t-butyl-5-methylphenol; or (iii) the (F) HALS is butanedioic acid dimethyl ester, polymer with 4-hydroxy-2,2,6,6-tetramethyl-1-piperidineethanol; or (iv) the (G) flame retardant is a metal hydroxide, an intumescent compound, or a halogenated compound; or (v) the (H) water tree retardant or electrical tree retardant that is a silane or a polyethylene glycol ("PEG"); or (vi) the (I) colorant is carbon black; or (vii) the (J) methyl radical scavenger is a derivative of 2,2,6,6-tetramethyl-1-piperidinyl-N-oxyl ("TEMPO" derivative); or (viii) the (K) LASH is an alkane or alkyl-substituted arene; or (ix) a combination of (i) and (ii); or (x) a combination of (i), (ii), and at least one of (iii) to (viii); or (xi) a combination of (i), (ii), (iii), and optionally 0 to 2 of (iv) to (viii); and wherein each of the constituents (D), (F), (G), (H), (I), (J), and (K) independently is (a) from 0.30 to 2.10 wt %; or (b) from 0.05 to 0.5 wt %; or (c) from 0.010 to 0.35 wt %; and wherein each (E) second antioxidant independently is (a) from 0.01 to 0.2 wt %; or (b) from 0.01 to 0.10 wt %; wherein all wt % based on total weight of the peroxide-curable polyolefin composition and the combined weight of the (D) to (K) is from >0.01 to 4.69 wt % of the total weight of the peroxide-curable polyolefin composition.

Aspect 7. A method of making a peroxide-curable polyolefin composition, the method comprising contacting effective amounts of constituents (A) to (C): (A) a peroxide-curable polyolefin resin, (B) an organic peroxide, and (C) 4-[[4,6-bis(octylthio)-1,3,5-triazin-2-yl]amino]-2,6-bis(1,1-dimethylethyl)-phenol ("BOTAP"); to give the peroxide-curable polyolefin composition; wherein the peroxide-curable polyolefin composition contains from 95.0 to 99.70 weight percent (wt %) of (A), from 0.20 to 2.5 wt % of (B), and from 0.01 to 0.50 wt % of (C), all wt % based on total weight of the peroxide-curable polyolefin composition. When the sum of the wt % of constituents (A) to (C) is less than 100.00 wt %, the peroxide-curable polyolefin composition further contains at least one additional constituent, such as constituents (D) to (K) described above.

Aspect 8. A peroxide-cured polyolefin product that is a reaction product of curing the peroxide-curable polyolefin composition of any one of aspects 1 to 6 to give the peroxide-cured polyolefin product. The peroxide-cured polyolefin product differs in structure from its peroxide-curable polyolefin composition from which it is made (e.g., crosslink density or extent of cure such as measured by moving die rheometer (MDR), gel content, or hot creep/hot set measurements).

Aspect 9. A manufactured article comprising a shaped form of the peroxide-cured polyolefin product of aspect 8.

Aspect 10. A coated conductor comprising a conductive core and an insulation layer at least partially covering the conductive core, wherein at least a portion of the insulation layer comprises the peroxide-curable polyolefin composition of any one of aspects 1 to 6 or the peroxide-cured polyolefin product of aspect 8. The coated conductor may be an electrical cable useful for transmitting electricity.

Aspect 11. A method of conducting electricity, the method comprising applying a voltage across the conductive core of the coated conductor of aspect 10 so as to generate a flow of electricity through the conductive core.

The peroxide-curable polyolefin composition. The total weight of all constituents is 100 wt %. The peroxide-curable polymer composition contains the constituents (A) to (C), described in more detail later. The peroxide-curable polyolefin composition contains (A) peroxide-curable polyolefin resin, which are crosslinkable macromolecules that are substantially free or free of heteroatoms (e.g., halogen, N, O, S, P). Under curing conditions (typically comprising heating to a temperature above 160° C.) the (B) organic peroxide forms oxygen-radicals. The O-radicals abstract hydrogen atoms from interior carbon atoms in backbones or side chains of the (A) peroxide-curable polyolefin resin, thereby generating internal polyolefinic chain free radicals on carbon atoms. The carbon radicals couple to form the peroxide-cured polyolefin product.

The peroxide-curable polyolefin composition may be a one-part formulation, alternatively a two-part formulation. The two-part formulation may comprise first and second parts, wherein the first part consists essentially of (A) peroxide-curable polyolefin resin; wherein the second part consists essentially of an additive masterbatch composition comprising (B) organic peroxide and any optional constituents (e.g., (D) to (K)); wherein the constituent (C) may be in the first or second part or both. There is no inherent reason why any combination of constituents (B) and (C); and constituents (D) to (K), if any, cannot be in either the one-part formulation or the first part or the second part of the two-part formulation. There generally aren't any incompatibilities amongst constituents (A) to (K) because inventive embodiments solve a problem of acid-catalyzed decomposition of (B) organic peroxide.

Constituent (A): the peroxide-curable polyolefin resin. The peroxide-curable polyolefin resin comprises polyolefinic macromolecules capable of becoming crosslinked (crosslinkable macromolecules) via a curing reaction under curing conditions, thereby forming a networked polymer, which is also referred to herein as the peroxide-cured polyolefin product. The crosslinkable polyolefinic macromolecules contain on average per molecule more than two abstractable carbon-bonded hydrogen atoms (C—H). The crosslinkable polyolefinic macromolecules may be homopolymers or copolymers. The copolymer may be a bipolymer prepared from ethylene and one comonomer. The copolymer may be a terpolymer prepared from ethylene and two different comonomers. For homopolymers, the monomer may be ethylene or a $(C_3-C_{20})$alpha-olefin. For copolymers, the monomer may be ethylene, alternatively propene; and the comonomer(s) may be a $(C_3-C_{20})$alpha-olefin(s). Typically the $(C_3-C_{20})$alpha-olefin is a $(C_3-C_{10})$alpha-olefin. Typically the $(C_3-C_{10})$alpha-olefin is propene, 1-butene, 1-hexene, or 1-octene; alternatively propene, 1-butene, or 1-hexene; alternatively propene; alternatively 1-butene; alternatively 1-hexene. Examples of suitable (A) are described earlier and below. The (A) may be in a divided solid form. The divided solid form may comprise granules, pellets, powder, or a combination of any two or more thereof.

In some aspects the (A) peroxide-curable polyolefin resin is an ethylene-based polymer. As used herein, "ethylene-based" polymers are macromolecules prepared from ethylene monomers as the primary (i.e., greater than 50 weight percent ("wt %")) monomer component, though other comonomers may also be employed. Thus, ethylene-based polymer include polyethylene homopolymers and copolymers. The ethylene-based copolymer may be an ethylene/alpha-olefin ("α-olefin") interpolymer having an α-olefin content of at least 1 wt %, at least 5 wt %, at least 10 wt %, at least 15 wt %, at least 20 wt %, or at least 25 wt % based on the entire interpolymer weight. These interpolymers may have an α-olefin content of less than 50 wt %, less than 45 wt %, less than 40 wt %, or less than 35 wt % based on the entire interpolymer weight. When an α-olefin is employed, the α-olefin may be a $(C_3-C_{20})$ (i.e., having 3 to 20 carbon atoms) linear, branched, or cyclic α-olefin. Examples of $(C_1-C_{20})$α-olefins include propene, 1-butene, 4-methyl-1-pentene, 1-hexene, 1-octene, 1-decene, 1-dodecene, 1-tetradecene, 1-hexadecene, and 1-octadecene. The α-olefins may also have a cyclic structure such as cyclohexane or cyclopentane, resulting in an α-olefin such as 3-cyclohexyl-1-propene (allyl cyclohexane) and vinyl cyclohexane. Illustrative ethylene/α-olefin interpolymers include ethylene/propylene, ethylene/1-butene, ethylene/1-hexene, ethylene/1-octene, ethylene/propylene/1-octene, ethylene/propylene/1-butene, and ethylene/1-butene/1-octene. Examples of suitable ethylene-based polymers are the polyethylenes described in U.S. Pat. No. 6,656,986 B2, such as at column 2, line 62, to column 5, line 6. E.g., high pressure reactor processes used to prepare so-called high pressure reactor pcLDPE are described beginning at column 3, line 21.

The ethylene-based polymer of aspects of constituent (A) may be used alone or in combination with one or more other types of ethylene-based polymers (e.g., a blend of two or more ethylene-based polymers that differ from one another by monomer composition and content, catalytic method of preparation, etc.). If a blend of ethylene-based polymers is employed, the polymers may be blended by any in-reactor or post-reactor process. In some embodiments, the ethylene-based polymer is a low-density polyethylene ("LDPE"), a linear-low-density polyethylene ("LLDPE"), a very-low-density polyethylene ("VLDPE"), or a combination or blend of any two or more thereof.

In some aspects of constituent (A) the LDPEs are generally highly branched ethylene homopolymers, and may be prepared via high pressure processes (i.e., HP-LDPE). LDPEs suitable for use herein may have a density ranging from 0.91 to 0.94 g/cm$^3$. In some embodiments, the ethylene-based polymer is a high-pressure LDPE having a density of at least 0.915 g/cm$^3$, but less than 0.94 g/cm$^3$, or less than 0.93 g/cm$^3$. Polymer densities provided herein are determined according to ASTM International ("ASTM") method D792. LDPEs suitable for use herein may have a melt index ($I_2$) of less than 40 g/10 min., or ranging from 0.1 to 40 g/10 min., or from 0.5 to 20 g/10 min., or from 0.5 to 5 g/10 min., or from 1 to 3 g/10 min., or an $I_2$ of 2 g/10 min. Melt indices provided herein are determined according to ASTM method D1238. Unless otherwise noted, melt indices are determined at 190° C. and 2.16 Kg (i.e., $I_2$). Generally, LDPEs have a broad molecular weight distribution ("MWD") resulting in a relatively high polydispersity index ("PDI;" ratio of weight-average molecular weight to number-average molecular weight).

In some aspects of constituent (A) the ethylene-based polymer may be a LLDPE. LLDPEs are generally ethylene-based polymers having a heterogeneous distribution of comonomer (e.g., α-olefin monomer), and are characterized by short-chain branching. For example, LLDPEs may be copolymers of ethylene and α-olefin monomers, such as those described above. LLDPEs suitable for use herein may have a density ranging from 0.916 to 0.925 g/cm$^3$. LLDPEs suitable for use herein may have a melt index ($I_2$) ranging from 0.1 to 40 g/10 min., 1 to 20 g/10 min., or from 3 to 8 g/10 min.

In some aspects of constituent (A) the ethylene-based polymer may contain one or more polar comonomers, such as acrylates or vinyl acetates. Additionally, blends of non-polar ethylene-based polymers, such as those described above, and polar copolymers (e.g., those copolymers containing one or more types of polar comonomers), may also be employed. Furthermore, polyolefin elastomers, such as those commercially available under the trade name ENGAGE™ from The Dow Chemical Company, may be used as the ethylene-based polymer or in combination with one or more of the above-described ethylene-based polymers. Polyolefin elastomers suitable for use herein may have a density ranging from 0.857 g/cm$^3$ to 0.908 g/cm$^3$. Polyolefin elastomers suitable for use herein may have a melt index ($I_2$) ranging from 0.1 to 30 g/10 min., or from 0.5 to 5 g/10 min.

The (A) peroxide-curable polyolefin resin may be obtained from commercial suppliers or may be prepared by polymerizing a monomer to give homopolymer, or copolymerizing a monomer and at least one, and typically not more than three, comonomer(s) to give the copolymers. Polymerization methods suitable for making (A) are generally well-known. They typically employ an olefin polymerization catalyst such as the well-known Ziegler-Natta catalysts and/or the well-known molecular catalysts. Such catalysts are well-known. The catalysts are made by contacting corresponding procatalysts with an activator such as an alkylaluminoxane (e.g., methylaluminoxane), a trialkylaluminum (e.g., triethylaluminum), and/or an organoborate compound (e.g., N,N-dimethylanilinium tetrakis(pentafluorophenyl)borate) or organoborane compound (e.g., tris(pentafluorophenyl)borane). Ziegler-Natta procatalysts may be a titanium tetrachloride supported on magnesium chloride. Molecular procatalyst for olefin polymerizations may be unsupported or supported. Molecular procatalyst is generally a metal complex with a well-defined structure. The molecular procatalyst may upon activation give a homogeneous single site or multi-site (2 or 3 site) molecular catalyst that is effective for polymerizing ethylene and alpha-olefins. The molecular procatalyst may be any molecular ligand-transition metal complex in which the transition metal is a Group 3 to 11 element of the Periodic Table of Elements, including the lanthanides and actinides. In some aspects the transition metal is Ti, Zr, Hf, V, or Cr. In some aspects the transition metal is selected from the group of any four of Ti, Zr, Hf, V, and Cr. In some aspects the transition metal is Fe, Co, Ni, or Pd. In some aspects the molecular catalyst may polymerize olefins in gas phase, or in solution under high temperature solution process conditions. In some aspects the molecular catalyst may be selected from any one or more of bis-phenylphenoxy catalysts, constrained geometry catalysts, imino-amido type catalysts, pyridyl-amide catalysts, imino-enamido catalysts, aminotroponiminato catalysts, amidoquinoline catalysts, bis(phenoxy-imine) catalysts, phosphinimide catalysts, and metallocene catalysts. Polymerization methods suitable for making (A) are well known and include gas phase, solution phase, and slurry phase methods. The gas phase process may be a gas phase ethylene polymerization process such as the UNIPOL™ PE process.

Production processes used for preparing ethylene-based polymers are wide, varied, and known in the art. Any conventional or hereafter discovered production process for producing ethylene-based polymers having the properties described above may be employed for preparing the ethylene-based polymers described herein. In general, polymerization may be accomplished at conditions known in the art for Ziegler-Natta, chromium oxide, or Kaminsky-Sinn type polymerization reactions, that is, at temperatures from 0 to 250° C., or 30 or 200° C., and pressures from atmospheric to 10,000 atmospheres (approximately 1,013 MegaPascals ("MPa")). In most polymerization reactions, the molar ratio of catalyst to polymerizable compounds employed is from $10^{-12}:1$ to $10^{-1}:1$, or from $10^{-9}:1$ to $10^{-5}:1$.

Constituent (B): organic peroxide. The (B) organic peroxide may be of formula $R^O$—O—O—$R^O$, wherein each $R^O$ independently is a ($C_1$-$C_{20}$)alkyl group or ($C_6$-$C_{20}$)aryl group. Each ($C_1$-$C_{20}$)alkyl group independently is unsubstituted or substituted with 1 or 2 ($C_6$-$C_{12}$)aryl groups. Each ($C_6$-$C_{20}$)aryl group is unsubstituted or substituted with 1 to 4 ($C_1$-$C_{10}$)alkyl groups. The (B) organic peroxide may be any one of the organic peroxides described earlier. Alternatively, (B) may be bis(1,1-dimethylethyl) peroxide; bis(1,1-dimethylpropyl) peroxide; 2,5-dimethyl-2,5-bis(1,1-dimethylethylperoxy) hexane; 2,5-dimethyl-2,5-bis(1,1-dimethylethylperoxy) hexyne; 4,4-bis(1,1-dimethylethylperoxy) valeric acid, butyl ester; 1,1-bis(1,1-dimethylethylperoxy)-3,3,5-trimethylcyclohexane; or benzoyl peroxide. Alternatively (B) may be tert-butyl peroxybenzoate, di-tert-amyl peroxide ("DTAP"), bis(alpha-t-butyl-peroxyisopropyl) benzene ("BIPB"), isopropylcumyl t-butyl peroxide, t-butylcumylperoxide, di-t-butyl peroxide, 2,5-bis(t-butylperoxy)-2,5-dimethylhexane, 2,5-bis(t-butylperoxy)-2,5-dimethylhexyne-3,1,1-bis(t-butylperoxy)-3,3,5-trimethylcyclohexane, isopropylcumyl cumylperoxide, butyl 4,4-di(tert-butylperoxy) valerate, di(isopropylcumyl) peroxide, and combinations of two or more thereof. In some aspects only a single type of (B) organic peroxide is used, e.g., dicumyl peroxide.

Constituent (C): the 4-[[4,6-bis(octylthio)-1,3,5-triazin-2-yl]amino]-2,6-bis(1,1-dimethylethyl)-phenol, also known as 4-[[4,6-bis(octylsulfanyl)-1,3,5-triazin-2-yl]amino]-2,6-di(tertiary-butyl)-phenol, and abbreviated herein as "BOTAP". BOTAP has CAS number 991-84-4 and the following chemical structure:

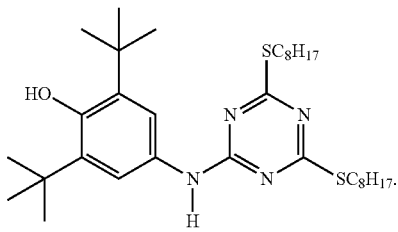

BOTAP is commercially available as BNX® 565 from Mayzo, Inc., Suwanee, Ga., USA; and as IRGANOX™ 565 from BASF Corporation, Florham Park, N.J., USA. Alternatively, BOTAP may be synthesized following known literature methods of synthesizing BOTAP.

Optionally, the peroxide-curable polyolefin composition, and/or the peroxide-cured polyolefin product made therefrom by curing same, may contain zero, one, or more coagents and/or zero, one, or more additives and/or zero, one or more liquid aromatic or saturated hydrocarbons (LASH). In addition to constituents (D) to (K) described earlier and detailed below, the peroxide-curable polyolefin composition may further comprise 0.005 to 0.5 wt % each of one or more additives selected from a carrier resin, a corrosion inhibitors (e.g., $SnSO_4$), fillers, lubricants, processing aids, anti-blocking agents, anti-static agents, nucleating agents, scorch retardants, slip agents, plasticizers, tackifiers, surfactants, extender oils, acid scavengers, voltage stabilizers, and metal deactivators. The carrier resin may be used to prepare an additive masterbatch for facilitating mixing or blending of the additives and/or (C), and in some aspects (B), with the (A) peroxide-curable polyolefin resin as described later. The filler may be a hydrophobized fumed silica such as those commercially available under the CAB-O-SIL trade name from Cabot Corporation. The processing aid may be an organic processing aid such as a fluoropolymer or a silicone processing aid such as a polyorganosiloxane or fluoro-functionalized polyorganosiloxane and may function to improve flow of a melt of the peroxide-curable polyolefin composition through a machine such as an extruder. The inclusion of the coagent(s) and/or additive(s) and/or LASH(s) in, or the exclusion of same from, the composition and/or product is optional.

Coagents, such as the at least one (D) ($H_2C$=C(H)($CH_2$)$_b$-functional) coagent, may be used in the peroxide-curable polyolefin composition to increase crosslink density in the peroxide-cured polyolefin product. Additives, such as constituents (E) to (J), may be used to impart to either to the composition and/or to the product, one or more beneficial properties other than to crosslink density. The (K) LASH(s) may be used to prepare, purge, or carry the peroxide-curable polymer composition or peroxide-cured polyolefin product. Coagents and additives are distinct compounds/materials from constituents (A) to (C) and from each other and from LASH. Additives typically are not removed from the peroxide-cured polyolefin product. Coagents typically react to form crosslinks in the peroxide-cured polyolefin product. LASH are chemically inert and may be volatile.

The optional constituent (D): the $H_2C$=C(H)($CH_2$)$_b$-functional coagent. Also called ($H_2C$=C(H)($CH_2$)$_b$-functional) crosslinker. The $H_2C$=C(H)($CH_2$)$_b$-functional coagent may have 1 or more, typically at most 6, ($H_2C$=C(H)($CH_2$)$_b$-functional groups on average per molecule. Subscript b is an integer of 0, 1, or 2; alternatively 0 or 1; alternatively 1 or 2; alternatively 0 or 3; alternatively 0; alternatively 1; alternatively 2. Examples of the ($H_2C$=C(H)($CH_2$)$_b$-functional groups are vinyl groups (b is 0), allyl groups (b is 1) and butenyl groups (b is 2). The (D) may have a molecule of molecular weight from 110 to 600 grams/mole (g/mol), alternatively 200 to 550 g/mol. Examples of (D) having 1 ($H_2C$=C(H)($CH_2$)$_b$-functional group include alpha-methylstyrene dimer ("AMSD"; CAS No. 6362-80-7). The (D) may be a multi($H_2C$=C(H)($CH_2$)$_b$-functional) coagent having 2, 3, or 4 ($H_2C$=C(H)($CH_2$)$_b$— groups. Examples of the multi($H_2C$=C(H)($CH_2$)$_b$-functional) coagent include triallyl isocyanurate ("TAIC"); triallyl cyanurate ("TAC"); triallyl trimellitate ("TATM"; CAS No. 2694-54-4); N,N,N',N',N",N"-hexaallyl-1,3,5-triazine-2,4,6-triamine ("HATATA"; also known as $N^2,N^2,N^4,N^4,N^6,N^6$-hexaallyl-1,3,5-triazine-2,4,6-triamine); triallyl orthoformate; pentaerythritol triallyl ether; triallyl citrate; and triallyl aconitate; acrylate-based coagents; multi-vinyl-based coagents; and other coagents such as those described in U.S. Pat. Nos. 5,346,961 and 4,018,852. Examples of suitable acrylate-based coagents are trimethylolpropane triacrylate ("TMPTA"); trimethylolpropane trimethyl acrylate ("TMPTMA"); ethoxylated bisphenol A dimethacrylate; 1,6-hexanediol diacrylate; pentaerythritol tetraacrylate; dipentaerythritol pentaacrylate; tris(2-hydroxyethyl) isocyanurate triacrylate; and propoxylated glyceryl triacrylate. Examples of suitable multi-vinyl-based coagents are polybutadiene having a high 1,2-divinyl content; and trivinyl cyclohexane ("TVCH"). In some aspects (D) is AMSD, TAC, TAIC, HATATA, or TMPTA; alternatively AMSD, TAC, or TAIC; alternatively AMSD. The (D) functions to increase crosslink density in the resulting cured polyolefin product relative to crosslink density that can be obtained in the absence of the (D).

The optional constituent (E) second antioxidant. The (E) functions to provide additive or synergistic antioxidizing properties to the peroxide-curable polyolefin composition and/or peroxide-cured polyolefin product without preventing the inventive decrease in peroxide instability. Examples of suitable (E) are described earlier. (E) may be bis(4-(1-methyl-1-phenylethyl)phenyl)amine (e.g., NAUGARD 445). Alternatively, (E) may be 2,2'-thiobis(2-t-butyl-5-methylphenol (CAS No. 90-66-4, commercially LOWINOX TBM-6); 2,2'-thiobis(6-t-butyl-4-methylphenol (CAS No. 90-66-4, commercially LOWINOX TBP-6); tris[(4-tert-butyl-3-hydroxy-2,6-dimethylphenyl)methyl]-1,3,5-triazine-2,4,6-trione (e.g., CYANOX 1790); or pentaerythritol tetrakis(3-(3,5-bis(1,1-dimethylethyl)-4-hydroxyphenyl) propionate (e.g., IRGANOX 1010, CAS Number 6683-19-8); 3,5-bis(1,1-dimethylethyl)-4-hydroxybenzenepropanoic acid 2,2'-thiodiethanediyl ester (e.g., IRGANOX 1035, CAS Number 41484-35-9); or distearyl thiodipropionate ("DSTDP"). In some aspects (E) is absent. In some aspects (E) is present and is 2,2'-thiobis(2-t-butyl-5-methylphenol (e.g., LOWINOX TBM-6) or tris[(4-tert-butyl-3-hydroxy-2, 6-dimethylphenyl)methyl]-1,3,5-triazine-2,4,6-trione (e.g., CYANOX 1790); alternatively tris[(4-tert-butyl-3-hydroxy-2,6-dimethylphenyl)methyl]-1,3,5-triazine-2,4,6-trione (e.g., CYANOX 1790).

The optional constituent (F) hindered amine light stabilizer (HALS). The (F) is a compound that inhibits oxidative degradation and can also reduce acid-catalyzed degradation, if any, of (B) organic peroxide. Examples of suitable (F) are butanedioic acid dimethyl ester, polymer with 4-hydroxy-2, 2,6,6-tetramethyl-1-piperidine-ethanol (CAS No. 65447-77-0, commercially LOWILITE 62).

The optional constituent (G) flame retardant. The (G) functions to decrease flammability of the peroxide-cured polyolefin product. Examples of suitable (G) are described earlier or below.

The optional constituent (H) water tree retardant or electrical tree retardant. The water tree retardant is a compound that inhibits water treeing, which is a process by which polyolefins degrade when exposed to the combined effects of an electric field and humidity or moisture. The electrical tree retardant is a compound that inhibits electrical treeing, which is an electrical pre-breakdown process in solid electrical insulation due to partial electrical discharges. Electrical treeing can occur in the absence of water. Water treeing and electrical treeing are problems for electrical cables that contain a coated conductor wherein the coating contains a polyolefin. Examples of suitable (H) are described earlier or below.

The optional constituent (I) colorant. E.g., a pigment or dye. E.g., carbon black or titanium dioxide.

The optional constituent (J) methyl radical scavenger. The (J) react with methyl radicals in the composition or product. The (J) may be a "TEMPO" derivative of 2,2,6,6-tetramethyl-1-piperidinyl-N-oxyl. Examples include 4-acryloxy-2, 2,6,6-tetramethyl-1-piperidinyl-N-oxyl (CAS No. 21270-85-9, "acrylate TEMPO"), 4-allyloxy-2,2,6,6-tetramethyl-1-piperidinyl-N-oxyl (CAS No. 217496-13-4, "allyl TEMPO"); bis(2,2,6,6-tetramethyl-1-piperidinyl-N-oxyl) sebacate (CAS No. 2516-92-9, "bis TEMPO")); N,N-bis (acryloyl-4-amino)-2,2,6,6-tetramethyl-1-piperidinyl-N-oxyl (CAS No. 1692896-32-4, "diacrylamide TEMPO"); and N-acryloyl-4-amino-2,2,6,6-tetramethyl-1-piperidinyl-N-oxyl (CAS No. 21270-88-2, "monoacrylamide TEMPO").

The optional constituent (K) liquid aromatic or saturated hydrocarbon (LASH). The LASH may have a boiling point (101 kilopascals (kPa)) of from 30° to 300° C., alternatively 40° to 250° C., alternatively 50° to 200° C. Examples of suitable LASH are 2-methylbutane, pentane, hexane, heptane, toluene, xylene(s), and combinations of any two or more thereof.

Aspects of the peroxide-curable polyolefin composition may be called an unfilled composition when filler is absent therefrom. Aspects of the unfilled composition may be made by any suitable means. For example, an unfilled composition that contains constituent (A), with or without constituent (C), and with any optional constituents (D) to (K), but does not contain filler or (B) organic peroxide, and may or may not contain (C), may be made in a Brabender batch mixer by blending the constituents for 3 minutes at 180° C. melt temperature using cam blades at 30 rotations per minute (rpm) to give an unfilled melt mixture, then allowing the unfilled melt mixture to cool, and then contacting the resulting cooled mixture with (B) organic peroxide, and if (C) was not included earlier, to give the embodiments of the unfilled composition.

Aspects of the peroxide-curable polyolefin composition may be referred to as a filled composition when it further includes a filler. Aspects of the filled composition may be made by any suitable means. For example, aspects of the filled composition may be made in a Brabender batch mixer using 180° C. melt temperature by first adding the constituents (A) and with or without (C) into the mixer. Once the constituents (A) and optionally (C) have started melting, then add a filler, constituent (C) (if not already added), and optionally zero, one or more of (E) second antioxidants, followed by any other additives (D) and (F) to (K), at flux to give a filled melt mixture. Then homogenize the filled melt mixture for about 3 minutes, and allow the filled melt mixture to cool, and then contact the resulting cooled mixture with (B) organic peroxide to give the aspects of the filled composition.

To facilitate mixing of the constituent (A) peroxide-curable polyolefin resin with the constituent (C) and any optional constituents (D) to (K), and any of the other aforementioned optional additives not identified by letter, the (C) and any additives may be provided in the form of an additive masterbatch. The additive masterbatch may contain a dispersion of (C) and optionally one or more of such additives (e.g., carbon black) in the carrier resin. The carrier resin may be a poly(1-butene-co-ethylene) copolymer. In the additive masterbatch, the carrier resin may be from ≥90 wt % to <100 wt % and the (C) and any optional one or more additives together may be from >0 wt % to ≤10 wt % of the total weight of the additive masterbatch. In some aspects from 1 to 20 weight parts of the additive masterbatch may be mixed or blended with from 99 to 80 weight parts of the (A) peroxide-curable polyolefin resin to give a preparative mixture of blend thereof, which may then be pelletized according to the methods described here to give pellets. The pellets may then contacted with a suitable amount of the (B) organic peroxide to give the peroxide-curable polyolefin composition. Alternatively, (D), if any, may be omitted from the additive masterbatch and instead soaked into the pellets before, during, or after soaking of the pellets with (B). Alternatively, (B) organic peroxide may be included in the additive masterbatch and temperature of the additive masterbatch during its preparation and mixing with (A) may be kept well below a 10-hour half-life temperature of the (B).

The peroxide-cured polyolefin product. The peroxide-cured polyolefin product contains networked polyolefinic resins that contain C—C bond crosslinks. The networked polyolefinic resins comprise products of coupling the (A) peroxide-curable polyolefin resins. The peroxide-cured polyolefin product may also contain by-products of curing such as alcohol products of the reaction of the (B) organic peroxide. The peroxide-cured polyolefin product may also contain the (C) BOTAP. When, optionally, the peroxide-curable polyolefin composition further contains one or more of the optional coagent(s), additive(s), and/or LASH(s), the resulting peroxide-cured polyolefin product may also further contain the crosslinks formed from the coagent(s), the additive(s), and/or the LASH(s). The LASH(s) may be removed from the peroxide-cured polyolefin product to give a peroxide-cured polyolefin product that is free of, or contains from >0 to <1 wt % of LASH. Such removal may be performed by any suitable means such as decantation, devolatilization, distillation, evaporation, filtration, sparging with inert gas (e.g., anhydrous $N_2$ gas), and stripping. The peroxide-cured polyolefin product may be in a divided solid form or in continuous form. The divided solid form may comprise granules, pellets, powder, or a combination of any two or more thereof. The continuous form may be a molded part (e.g., blow molded part).

Test samples of embodiments of unfilled and filled compositions may be separately made into compression molded plaques. The mechanical properties of these compositions may be characterized using test samples cut from the compression molded plaques.

Any compound herein includes all its isotopic forms, including natural abundance forms and/or isotopically-enriched forms. The isotopically-enriched forms may have additional uses, such as medical or anti-counterfeiting applications, wherein detection of the isotopically-enriched form is helpful in treatment or investigation.

The following apply unless indicated otherwise. Alternatively precedes a distinct embodiment. ASTM means the standards organization, ASTM International, West Conshohocken, Pa., USA. IEC means the standards organization, International Electrotechnical Commission, Geneva, Switzerland. Any comparative example is used for illustration purposes only and shall not be prior art. Free of or lacks means a complete absence of; alternatively not detectable. IUPAC is International Union of Pure and Applied Chemistry (IUPAC Secretariat, Research Triangle Park, N.C., USA). May confers a permitted choice, not an imperative. Operative means functionally capable or effective. Optional (ly) means is absent (or excluded), alternatively is present (or included). PPM are weight based. Properties are measured using a standard test method and conditions for the measuring (e.g., viscosity: 23° C. and 101.3 kPa). Ranges include endpoints, subranges, and whole and/or fractional values subsumed therein, except a range of integers does not include fractional values. Room temperature: 23° C.±1° C. Substituted when referring to a compound means having, in place of hydrogen, one or more substituents, up to and including per substitution.

Advantageously we discovered that the antioxidant BOTAP contains many of the same functional groups found divided between tris[(4-tert-butyl-3-hydroxy-2,6-dimethylphenyl)methyl]-1,3,5-triazinane-2,4,6-trione and DSTDP and, optionally NAUGARD 445, albeit in a same molecule, and yet the inventive peroxide-curable polyolefin composition has robust peroxide stability relative to a comparative composition that uses either (a) a combination of antioxidants CYANOX 1790 and DSTDP and NAUGARD 445, or (b) a combination of antioxidant LOWINOX TBP-6 and the HALS LOWILITE 62; or (c) a combination of antioxidants CYANOX 1790 and DSTDP. An additional benefit is embodiments of these compositions/products also have superior dissipation factor relative to combination (a), (b), or (c), even when the inventive similar functional groups are in a same concentration as in combination (a), (b), or (c). An additional advantage is that BOTAP has less sweat-out than antioxidants such as CYANOX 1790 and NAUGARD 445.

Embodiments of the inventive composition and product that further comprise the at least one (D) ($H_2C=C(H)(CH_2)_b$-functional) coagent and/or the at least one (E) second antioxidant may have additional advantages such as improved scorch resistance. These characteristics make the inventive composition and product useful in a variety of applications including as a component of a coating of a coated conductor such as a coated wire or coated cable for use in the electrical or telecommunications industry, including medium voltage or high voltage, and extra-high voltage electrical cables.

Unless noted otherwise herein, use the following preparations for characterizations.

Composition Preparation Methods. Melt blend constituents of the peroxide-curable polyolefin composition (of comparative or inventive examples) either in a Banbury compounder using a typical compounding temperature of 150° C., rotor speed of 60 to 65 rotations per minute (rpm) or in a ZKS twin-screw extruder using an extrusion temperature of 160° C. or higher (e.g., 200° C.) and a screw speed of 200 rpm. For laboratory scale procedures, use batch mixers and single screw extruders for melt blending and pelletizing. Soak peroxide into the pellets containing the blended additives at 60° to 80° C. for 6 to 24 hours.

Pellet Preparation Method. Mix the (A) pcPE and a suitable amount of the (C) BOTAP, plus any optional additives (e.g., any optional antioxidants), typically not including the optional (D) multi($H_2C=C(H)(CH_2)_b$-functional) coagent, but not including (B) organic peroxide, in a Brabender bowl at 200° C. for 3 minutes after flux to give an organic peroxide-free, multi($H_2C=C(H)(CH_2)_b$-functional) coagent-free melt mixture. Flatten the melt mixture in a compression molding press, and cut the flattened product into small strips. Run the strips in a single screw extruder with a dual mixing head at 180° C. to form strands that are cut into small uniform pellets, which are free of (B) organic peroxide and preferably free of (D) multi($H_2C=C(H)(CH_2)_b$-functional) coagent. Place the pellets in a glass jar, place the glass jar in a preheated oven at 70° C., and heat the pellets for 4 hours to give heated pellets. Remove the glass jar containing heated pellets from the oven, and spray a suitable amount of either: method (a): (B) organic peroxide or method (b): suitable amounts of a combination of (B) organic peroxide and multi($H_2C=C(H)(CH_2)_b$-functional) coagent onto the heated pellets to give sprayed pellets in the jar. The suitable amount(s) are calculated based on weight of the melt mixture and weight of the (B) organic peroxide and any multi($H_2C=C(H)(CH_2)_b$-functional) coagent, not counting weight(s) any volatile solvent(s) used to facilitate spraying. The suitable amounts are designed to give claimed concentration(s) according to the wt % ranges described earlier for the (B) organic peroxide (e.g., 1.75 wt % or 1.8 wt %), (C) BOTAP (e.g., 0.12 wt %, 0.24 wt %, 0.36 wt %, or 0.42 wt %) and any multi($H_2C=C(H)(CH_2)_b$-functional) coagent (e.g., 0 wt %, 0.20 wt %, or 0.35 wt %). Seal the jar, and tumble roll the sprayed pellets for 10 minutes. Place the jar back in the oven at 70° C. for overnight to give soaked pellets. The soaked pellets prepared by method (a) have been soaked with (B) organic peroxide (e.g., dicumyl peroxide) and the soaked pellets prepared by method (b) have been soaked with a combination of (B) organic peroxide (e.g., dicumyl peroxide) and multi($H_2C=C(H)(CH_2)_b$-functional) coagent (e.g., AMSD). Test the soaked pellets for dissipation factor, extent of cure, and scorch improvement as described herein.

Unless noted otherwise herein, use the following test methods for characterizations. The soaked pellets prepared by method (a) or (b) of the Pellet Preparation Method may be used unless noted otherwise.

Density is measured according to ASTM D792-13, *Standard Test Methods for Density and Specific Gravity (Relative*

*Density) of Plastics by Displacement*, Method B (for testing solid plastics in liquids other than water, e.g., in liquid 2-propanol). Report results in units of grams per cubic centimeter (g/cm$^3$).

Dissipation Factor and Dielectric Constant Test Methods. Dissipation factor and dielectric constant are measured at 60 Hertz (Hz, stress), 2 kilovolt per millimeter (kV/mm) electrical stress, and a temperature of 120° C. using a guideline at 2 kilovolt per millimeter (kV/mm) load according to ASTM D150-11, *Standard Test Methods for AC Loss Characteristics and Permittivity (Dielectric Constant) of Solid Electrical Insulation*, on a 1-millimeter plaque using compression-molded, cured samples of peroxide-cured polyolefin product prepared from soaked pellets of the peroxide-curable polyolefin composition prepared according to the Pellet Preparation Method. The lower the dissipation factor, the better the peroxide-curable composition/peroxide-cured polyolefin product are for use as electrical insulation layers in coatings of coated conductors, and thus the better these compositions/products are for use as electrical insulators in electrical or telecommunications cables and applications. In some aspects the peroxide-curable polyolefin composition and peroxide-cured polyolefin product prepared therefrom are characterized by a dissipation factor measured according to the Dissipation Factor Test Method of 0.028% to 0.099%.

Melt index, $I_2$, for polyethylene is measured according to ASTM D1238-04, *Standard Test Method for Melt Flow Rates of Thermoplastics by Extrusion Platometer*, using conditions of 190° C./2.16 kilograms (kg), formerly known as "Condition E" and also known as $I_2$. Report results in units of grams eluted per 10 minutes (g/10 min.). Melt index is inversely proportional to the weight average molecular weight of the polyethylene, although the inverse proportionality is not linear. Thus, the higher the molecular weight, the lower the melt index.

Moving Die Rheometer (MDR) Test Method. Perform MDR test method at 182° C. according to ASTM D5289-12, *Standard Test Method for Rubber Property-Vulcanization Using Rotorless Cure Meters*, method version using sealed torsion shear cure meters, on an Alpha Technologies MDR 2000 instrument using pellet samples from the Pellet Preparation Method.

Peroxide Curing Test Method. The extent of curing is characterized as maximum torque (M.H.) measured at 182° C. in pound-inches (lb.-in.) using the MDR test method and soaked pellets of the peroxide-curable polyolefin composition prepared according to the Pellet Preparation Method. 1.00 lb.-in.=0.113 Newton-meter (N-m). The greater the M.H. value, advantageously the greater the extent of curing.

Peroxide Stability Test Method. Peroxide stability in the peroxide-curable polyolefin composition is characterized by heating soaked pellets made by the Pellet Preparation method, (a) in an oven at 70° C., and periodically measuring extent of cure according to the Peroxide Curing Test Method. Measurements in pound-inches (lb.-in.) may be taken at time 0 (initial, before heating), after 21 days at 70° C., and after 28 days at 70° C. The lesser the loss of extent of cure value over time, e.g., after 28 days at 70° C., the greater the peroxide stability in the peroxide-curable polyolefin composition. In some aspects the peroxide-curable polyolefin composition and peroxide-cured polyolefin product prepared therefrom are characterized by peroxide stability measured according to the Peroxide Stability Test Method after 28 days at 70° C. of 2.00 to 3.00 lb.-in., alternatively peroxide stability measured according to the Peroxide Stability Test Method after 28 days at 70° C. of greater than 90% (e.g., 91% to 99%) of the time 0 value.

Scorch Time Test Method. This method characterizes resistance to scorch as the time, ts1, to increase one pound-inch above the minimum torque (M.L.) measured at 140° C. using the MDR test method and soaked pellets of the peroxide-curable polyolefin composition prepared according to the Pellet Preparation Method. 1.00 lb.-in.=0.113 Newton-meter (N-m). The longer the ts1 time, advantageously the greater the extent of scorch resistance (also known as scorch retardance). In some aspects the peroxide-curable polyolefin composition and peroxide-cured polyolefin product prepared therefrom are characterized by resistance to scorch (MDR ts1) measured according to the Scorch Time Test Method of 30 to 95 minutes.

If desired a graphical plot of ts1 at 140° C. in minutes (y-axis) versus maximum torque (M.H.) at 182° C. in lb.-in. (x-axis) may be drawn. For inventive compositions having different concentrations of BOTAP but otherwise having the same concentration of (B) organic peroxide and any coagent (D) or optional additives, the graphical plot may be fitted to a first line having a negative slope with compositions having higher concentrations of BOTAP having higher ts1 values and compositions having lower concentrations of BOTAP having lower ts1 values. For other inventive compositions having the same different concentrations of BOTAP and same concentrations of any coagent (D) or optional additive, but a different concentration of (B) organic peroxide than used to plot the first line, a second graphical plot of ts1 at 140° C. in minutes (y-axis) versus maximum torque (M.H.) at 182° C. in lb.-in. (x-axis) may be drawn. The second graphical plot may be fitted to a second line having a negative slope with compositions having higher concentrations of BOTAP having higher ts1 values and compositions having lower concentrations of BOTAP having lower ts1 values. If plotted on a same graph, the first and second lines may have different slopes and may be spaced apart from each other. Such plots for inventive examples are available upon request.

Sweat-out Test Method. Add 50 g of pellet samples into a covered glass jar, and age the resulting sample-containing jars in an oven at 50° C. for 21 days. Remove the jars containing aged samples from the oven, and allow the aged samples to equilibrate at room temperature. To the aged samples add 80 mL of acetonitrile, and gently stir the resulting mixture with a stirring rod for 70 seconds. Allow the resulting mixture to stand for 56 days at room temperature. After 56 days, quantify the amount of additives in the acetonitrile portion of the mixture using high performance liquid chromatography-ultraviolet light detector (HPLC-UV). Report results in parts per million (ppm). (DSTDP cannot be analyzed for sweat-out using this method.) The lower the ppm value, the lesser the amount of sweat-out. In some aspects the peroxide-curable polyolefin composition and peroxide-cured polyolefin product prepared therefrom are characterized by BOTAP sweat-out measured according to the Sweat-out Test Method of 0.0 to 2 ppm, alternatively >0 to 1 ppm. In some aspects the peroxide-curable polyolefin composition contains constituent (B) that is dicumyl peroxide (DiCup) and it and the peroxide-cured polyolefin product prepared therefrom are characterized by DiCup sweat-out measured according to the Sweat-out Test Method of 60 to 90 ppm.

In some aspects the peroxide-curable polyolefin composition and peroxide-cured polyolefin product prepared therefrom are characterized by a combination of at least two of characterizations (i) to (v): (i) a dissipation factor measured according to the Dissipation Factor Test Method of 0.028% to 0.099%; (ii) a peroxide stability measured according to the Peroxide Stability Test Method after 28 days at 70° C. of 2.00 to 3.00 lb.-in., alternatively peroxide stability measured according to the Peroxide Stability Test Method after 28 days at 70° C. of greater than 90% (e.g., 91% to 99%) of the time 0 value; (iii) BOTAP sweat-out measured according to the Sweat-out Test Method of 0.0 to 2 ppm, alternatively >0 to 1 ppm; (iv) DiCup sweat-out measured according to the Sweat-out Test Method of 60 to 90 ppm; (v) resistance to scorch (MDR ts1) measured according to the Scorch Time Test Method of 30 to 95 minutes. In some aspects the combination is: (i) and (ii); alternatively (ii) and (iv); alternatively (ii) and (v); alternatively (i), (ii), and (v); alternatively (i), (ii), (iv), and (v); alternatively each of (i) to (v).

EXAMPLES

Constituent (A1): a pcLDPE characterized by a melt index (190° C., 2.16 kg), "$I_2$", of 2.1 g/10 min. and a density of 0.92 g/cm$^3$ ("PE1").

Constituent (B1): dicumyl peroxide ("DiCup").

Constituent (C1): BNX-565 (4-[[4,6-bis(octylthio)-1,3,5-triazin-2-yl]amino]-2,6-bis(1,1-dimethylethyl)-phenol, "BOTAP").

Constituent (D1): alpha-methylstyrene dimer ("AMSD").

Constituent (E1): CYANOX 1790 (tris[(4-tert-butyl-3-hydroxy-2,6-dimethylphenyl)methyl]-1,3,5-triazine-2,4,6-trione).

Constituent (E2): distearyl thiodipropionate ("DSTDP").

Constituent (E3): NAUGARD 445 (bis(4-(1-methyl-1-phenylethyl)phenyl)amine).

Constituent (E4): LOWINOX TBP-6 (2,2'-thiobis(6-t-butyl-4-methylphenol).

Constituent (E5): LOWINOX TBM-6 (2,2'-thiobis(2-t-butyl-5-methylphenol).

Constituent (F1): LOWILITE 62 (butanedioic acid dimethyl ester, polymer with 4-hydroxy-2,2,6,6-tetramethyl-1-piperidine-ethanol).

The Pellet Preparation Method and teachings herein prepared Comparative Examples 1 to 3 (CE1 to CE3) and Inventive Examples 1 to 8 (IE1 to IE8) by mixing the peroxide-curable polyolefin resin (A1) with the first antioxidant (C1) and any second antioxidant(s) (E1) to (E4), and any HALS (F1) to give bulk mixtures, which were then separately pelletized to give Comparative Preparations CP1 to CP3 and Inventive Preparations IP1 to IP8. Weight parts of the Comparative Preparations CP1 to CP3 and Inventive Preparations IP1 to IP8 were separately soaked with weight parts of the organic peroxide (B1), and any coagent (D1), to give Comparative Examples CE1 to CE3 and Inventive Examples IE1 to IE8, respectively. The compositions of CE1 to CE3 and IE1 to IE8 are described later in Tables 1, 2 and 3, respectively.

Tested the comparative examples CE1 to CE3 and inventive examples IE1 to IE8 for peroxide stability according to the Peroxide Stability Test Method, scorch resistance according to the Scorch Time Test Method, and for dissipation factor according to the Dissipation Factor and Dielectric Constant Test Methods, all as described earlier. Results are reported below in Tables 1 and 2. Tested for sweat-out of additives according to Sweat-out Test Method; results are reported later in Table 3.

TABLE 1

Compositions and Test Results for Comparative Examples. ("0" means 0.00)

| Constituent | CP1 | CP2 | CP3 |
|---|---|---|---|
| (A1) (PE1) | 99.50 | 99.26 | 99.64 |
| (C1) (BOTAP) | 0 | 0 | 0 |
| (E1) (CYANOX 1790) | 0.14 | 0 | 0.14 |
| (E2) (DSTDP) | 0.28 | 0 | 0.22 |
| (E3) (NAUGARD 445) | 0.08 | 0 | 0 |
| (E4) (LOWINOX TBP-6) | 0 | 0.24 | 0 |
| (E5) (LOWINOX TBM-6) | 0 | 0 | 0 |
| (F1) (LOWILITE 62) | 0 | 50 ppm | 0 |
| Preparation Total | 100.00 | 100.00 | 100.00 |

| Constituent | CE1 | CE2 | CE3 |
|---|---|---|---|
| CP1 | 98.20 | 0 | 0 |
| CP2 | 0 | 98.20 | 0 |
| CP3 | 0 | 0 | 98.20 |
| (B1) (DiCup) | 1.80 | 1.80 | 1.80 |
| (D1) (AMSD) | 0 | 0 | 0 |
| Example Total | 100.00 | 100.00 | 100.00 |
| Test | | | |
| MDR ts1 (minutes) | 61.5 | 51.1 | 51.8 |
| MDR M.H. - Initial (Time 0) (lb.-in.) | 2.23 | 2.39 | 2.66 |
| MDR M.H. 21 days at 70° C. (lb.-in.) | 1.82 | 2.20 | <0.41 |
| MDR M.H. 28 days at 70° C. (lb.-in.) | 1.14 | 1.87 | <0.41 |
| Dissipation Factor 120° C., 2 kV/mm (%) | 0.1034 | 0.0351 | Not Reported |

In Table 1, the peroxide-curable polyolefin composition and peroxide-cured polyolefin product of Comparative Example 1 contained, among other things, a problem combination of three antioxidants CYANOX 1790, DSTDP, and NAUGARD 445 and showed substantial peroxide instability. The peroxide-curable polyolefin composition and peroxide-cured polyolefin product of Comparative Example 2 contained, among other things, a problem combination of antioxidant LOWINOX TBP-6 and HALS LOWILITE 62 and showed some peroxide instability. The peroxide-curable polyolefin composition and peroxide-cured polyolefin product of Comparative Example 3 contained, among other things, a problem combination of two antioxidants CYANOX 1790 and DSTDP, and showed extreme peroxide instability.

TABLE 2

Compositions and Test Results for Inventive Examples.

| Constituent | IP1 | IP2 | IP3 | IP4 | IP5 | IP6 | IP7 | IP8 |
|---|---|---|---|---|---|---|---|---|
| (A1) (PE1) | 99.88 | 99.76 | 99.64 | 99.58 | 99.58 | 99.58 | 99.67 | 99.67 |
| (C1) (BOTAP) | 0.12 | 0.24 | 0.36 | 0.42 | 0.42 | 0.42 | 0.24 | 0.24 |
| (E1) (CYANOX 1790) | 0 | 0 | 0 | 0 | 0 | 0 | 0.09 | 0 |

TABLE 2-continued

Compositions and Test Results for Inventive Examples.

| Constituent | IP1 | IP2 | IP3 | IP4 | IP5 | IP6 | IP7 | IP8 |
|---|---|---|---|---|---|---|---|---|
| (E5) (LOWINOX TBM-6) | 0 | 0 | 0 | 0 | 0 | 0 | 0 | 0.09 |
| (F1) | 0 | 0 | 0 | 0 | 0 | 0 | 0 | 0 |
| Preparation Total | 100.00 | 100.00 | 100.00 | 100.00 | 100.00 | 100.00 | 100.00 | 100.00 |
| | IE1 | IE2 | IE3 | IE4 | IE5 | IE6 | IE7 | IE8 |
| IP1 | 98.20 | 0 | 0 | 0 | 0 | 0 | 0 | 0 |
| IP2 | 0 | 98.20 | 0 | 0 | 0 | 0 | 0 | 0 |
| IP3 | 0 | 0 | 98.20 | 0 | 0 | 0 | 0 | 0 |
| IP4 | 0 | 0 | 0 | 98.20 | 0 | 0 | 0 | 0 |
| IP5 | 0 | 0 | 0 | 0 | 98.20 | 0 | 0 | 0 |
| IP6 | 0 | 0 | 0 | 0 | 0 | 98.15 | 0 | 0 |
| IP7 | 0 | 0 | 0 | 0 | 0 | 0 | 98.20 | 0 |
| IP8 | 0 | 0 | 0 | 0 | 0 | 0 | 0 | 98.20 |
| (B1) (DiCup) | 1.80 | 1.80 | 1.80 | 1.75 | 1.60 | 1.50 | 1.80 | 1.80 |
| (D1) (AMSD) | 0 | 0 | 0 | 0 | 0.20 | 0.35 | 0 | 0 |
| Example Total | 100.00 | 100.00 | 100.00 | 100.00 | 100.00 | 100.00 | 100.00 | 100.00 |
| Test | IE1 | IE2 | IE3 | IE4 | IE5 | IE6 | IE7 | IE8 |
| MDR ts1 (minutes) | 31.2 | 34.4 | 35.6 | 41.7 | 65.6 | 92.3 | 42.7 | 43.9 |
| MDR M.H. - Initial (Time 0) (lb.-in.) | 2.93 | 2.88 | 2.85 | 2.59 | 2.72 | 2.36 | 2.69 | 2.53 |
| MDR M.H. 21 days at 70° C. (lb.-in.) | 2.90 | 2.79 | 2.63 | 2.53 | 2.63 | 2.07 | 2.74 | 2.62 |
| MDR M.H. 28 days at 70° C. (lb.-in.) | 2.96 | 2.98 | 2.82 | 2.47 | 2.6 | 2.03 | 2.92 | 2.48 |
| Dissipation Factor 120° C., 2 kV/mm (%) | 0.0405 | 0.0284 | 0.0253 | 0.0983 | 0.0706 | 0.0939 | 0.0198 | 0.0376 |

("0" means 0.00)

As shown in Table 2, the peroxide-curable polyolefin composition and peroxide-cured polyolefin product of Inventive Examples 1 to 6 (IE1 to IE6) contained, among other things, the single antioxidant BNX-565 (4-[[4,6-bis(octylthio)-1,3,5-triazin-2-yl]amino]-2,6-bis(1,1-dimethylethyl)-phenol, "BOTAP"), and showed robust peroxide stability. The peroxide-curable polyolefin composition and peroxide-cured polyolefin product of Inventive Examples 7 and 8 (IE7 & IE8) contained, among other things, the first antioxidant BNX-565 (4-[[4,6-bis(octylthio)-1,3,5-triazin-2-yl]amino]-2,6-bis(1,1-dimethylethyl)-phenol, "BOTAP") and a second antioxidant that was CYANOX 1790 (IE7) or LOWINOX TBM-6 (IE8), and showed robust peroxide stability. Further, all of the inventive compositions and products showed excellent dissipation factor. Thus, the inventive peroxide-curable polyolefin composition and peroxide-cured polyolefin product have robust peroxide stability relative to a comparative composition that uses either (a) a combination of antioxidants CYANOX 1790 and DSTDP and NAUGARD 445, or (b) a combination of antioxidants CYANOX 1790 and DSTDP, or (c) a combination of antioxidant LOWINOX TBP-6 and the HALS LOWILITE 62. The inventive peroxide-curable polyolefin composition and peroxide-cured polyolefin product have superior dissipation factor relative to a comparative composition that uses (a) a combination of antioxidants CYANOX 1790 and DSTDP and NAUGARD 445. The scorch resistance (MDR ts1) of the peroxide-curable polyolefin composition and peroxide-cured polyolefin product may be graphically plotted (available upon request) with ts1 at 140° C. in minutes on the y-axis and maximum torque (M.H.) at 182° C. in lb.-in. on the x-axis. The scorch resistance (MDR ts1) of the peroxide-curable polyolefin composition and peroxide-cured polyolefin product is excellent. The foregoing data show that the inventive composition and product have performance characteristics that make the inventive composition and product useful in a variety of applications including as a component of a coating of a coated conductor such as a coated wire or coated cable.

TABLE 3

Sweat-out Test Results for Inventive Examples.

| Constituent | CE1 | IE1 | IE2 | IE3 | IE4 | IE7 | IE8 |
|---|---|---|---|---|---|---|---|
| (C1) (BOTAP) | N/a | Not detected | <1 ppm | <1 ppm | <1 ppm | <1 ppm | <1 ppm |
| (E1) (CYANOX 1790) | 50 ppm | N/a | N/a | N/a | N/a | 1 ppm | N/a |
| (E3) (NAUGARD 445) | 9 ppm | N/a | N/a | N/a | N/a | N/a | N/a |
| (E5) (LOWINOX TBM-6) | N/a | N/a | N/a | N/a | N/a | N/a | <1 ppm |
| (B1) DiCup | 108 ppm | 77 ppm | 81 ppm | 64 ppm | 74 ppm | 76 ppm | 75 ppm |

(N/a means not applicable)

As shown by the sweat-out data for different additives above in Table 3, a comparative composition with CYANOX 1790 and NAUGARD 445 (CE1) gave 50 ppm and 9 ppm sweat-out, respectively. Compositions with BOTAP have surprisingly significantly less sweat-out than these additives. For IE1 with 0.12 wt % BOTAP, sweat out of BOTAP was not detected. For compositions with 0.24 wt % BOTAP (IE2, IE7, and IE8), 0.36 wt % BOTAP (IE3), or 0.42 wt % BOTAP (IE4), sweat-out of BOTAP was less than 1 ppm (<1 ppm), a beneficially very low level. Further, the inventive compositions IE1 to IE4, IE7, and IE8 each had lower sweat-out of (B1) DiCup than did comparative composition CE1.

Incorporate by reference here the below claims as numbered aspects except replace "claim" and "claims" by "aspect" or "aspects," respectively.

The invention claimed is:

1. A peroxide-curable polyolefin composition comprising constituents (A) to (C): (A) a peroxide-curable polyolefin resin, (B) an organic peroxide, and (C) 4-[[4,6-bis(octylthio)-1,3,5-triazin-2-yl]amino]-2,6-bis(1,1-dimethylethyl)-phenol ("BOTAP"); wherein the peroxide-curable polyolefin composition contains from 95.0 to 99.70 weight percent (wt %) of (A), from 0.20 to 2.5 wt % of (B), and from 0.01 to 0.50 wt % of (C), and further comprising (i) at least one (D) ($H_2C$=$C(H)(CH_2)_b$-functional) coagent that is alpha-methylstyrene dimer, wherein subscript b is an integer of 0, 1, or 2, or (ii) at least one (E) a second antioxidant that is tris[(4-tert-butyl-3-hydroxy-2,6-dimethylphenyl)methyl]-1,3,5-triazine-2,4,6-trione; all wt % based on total weight of the peroxide-curable polyolefin composition; and further comprising (iii) (F) a hindered amine light stabilizer ("HALS") that is butanedioic acid dimethyl ester, polymer with 4-hydroxy-2,2,6,6-tetramethyl-1-piperidine-ethanol; or (iv) (G) a flame retardant that is a metal hydroxide, an intumescent compound, or a halogenated compound; or (v) (H) a water tree retardant or electrical tree retardant that is a silane or a polyethylene glycol; or (vi) (I) a colorant that is carbon black; or (vii) (J) a methyl radical scavenger that is a derivative of 2,2,6,6-tetramethyl-1-piperidinyl-N-oxyl; or (viii) (K) a liquid aromatic or saturated hydrocarbon that is an alkane or alkyl-substituted arene; or (ix) a combination of (i) and (ii); or (x) a combination of (i), (ii), and at least one of (iii) to (viii); or (xi) a combination of (i), (ii), and (iii); and
wherein each of the constituents (D), (F), (G), (H), (I), (J), and (K) independently is (a) from 0.30 to 2.10 wt %; or (b) from 0.05 to 0.5 wt %; or (c) from 0.010 to 0.35 wt %; and wherein each (E) second antioxidant independently is (a) from 0.01 to 0.2 wt %; or (b) from 0.01 to 0.10 wt %; wherein all wt % based on total weight of the peroxide-curable polyolefin composition and the combined weight of the (D) to (K) is from >0.01 to 4.69 wt % of the total weight of the peroxide-curable polyolefin composition.

2. The peroxide-curable polyolefin composition of claim 1 wherein the (A) peroxide-curable polyolefin resin is (i) a peroxide-curable polyethylene resin ("pcPE"); or (ii) a pcPE that is a peroxide-curable low density polyethylene resin ("pcLDPE"); or (iii) a pcPE that is a peroxide-curable high density polyethylene resin ("pcHDPE"); or (iv) a pcPE that is a mixture of an ethylene ($C_1$-$C_4$)alkyl acrylate copolymer (EAA) and a peroxide-curable polyethylene ("pcPE"); or (v) a pcPE that is a pcLDPE characterized by a melt index (190° C., 2.16 kg), "$I_2$", of from 0.5 to 3.0 grams per 10 minutes (g/10 min.) and a density of 0.90 to 0.95 grams per cubic centimeter (g/cm$^3$); or (vi) a combination of any two or more of (i) to (iv).

3. The peroxide-curable polyolefin composition of claim 1 wherein the (B) organic peroxide is dicumyl peroxide.

4. The peroxide-curable polyolefin composition of claim 1 wherein (i) the (B) organic peroxide is from 0.20 to 2.10 wt %; or (ii) the (B) organic peroxide is from 0.50 to 2.00 wt %; or (iii) the (C) BOTAP is from 0.015 to 0.50 wt %; or (iv) the (C) BOTAP is from 0.05 to 0.42 wt %; or (v) or a combination of either (i) and (iii), (i) and (iv), (ii) and (iii), or (ii) and (iv); wherein all wt % based on total weight of the peroxide-curable polyolefin composition.

5. A method of making a peroxide-curable polyolefin composition, the method comprising contacting effective amounts of constituents (A) to (C): (A) a peroxide-curable polyolefin resin, (B) an organic peroxide, and (C) 4-[[4,6-bis(octylthio)-1,3,5-triazin-2-yl]amino]-2,6-bis(1,1-dimethylethyl)-phenol; to give the peroxide-curable polyolefin composition; wherein the peroxide-curable polyolefin composition contains from 95.0 to 99.70 weight percent (wt %) of (A), from 0.20 to 2.5 wt % of (B), and from 0.01 to 0.50 wt % of (C), and further comprising (i) at least one (D) ($H_2C$=$C(H)(CH_2)_b$-functional) coagent that is alpha-methylstyrene dimer, wherein subscript b is an integer of 0, 1, or 2, or (ii) at least one (E) a second antioxidant that is (tris[(4-tert-butyl-3-hydroxy-2,6-dimethylphenyl)methyl]-1,3,5-triazine-2,4,6-trione; all wt % based on total weight of the peroxide-curable polyolefin composition; and further comprising (iii) (F) a hindered amine light stabilizer ("HALS") that is butanedioic acid dimethyl ester, polymer with 4-hydroxy-2,2,6,6-tetramethyl-1-piperidine-ethanol; or (iv) (G) a flame retardant that is a metal hydroxide, an intumescent compound, or a halogenated compound; or (v) (H) a water tree retardant or electrical tree retardant that is a silane or a polyethylene glycol; or (vi) (I) a colorant that is carbon black; or (vii) (J) a methyl radical scavenger that is a derivative of 2,2,6,6-tetramethyl-1-piperidinyl-N-oxyl; or (viii) (K) a liquid aromatic or saturated hydrocarbon that is an alkane or alkyl-substituted arene; or (ix) a combination of (i) and (ii); or (x) a combination of (i), (ii), and at least one of (iii) to (viii); or (xi) a combination of (i), (ii), and (iii); and
wherein each of the constituents (D), (F), (G), (H), (I), (J), and (K) independently is (a) from 0.30 to 2.10 wt %; or (b) from 0.05 to 0.5 wt %; or (c) from 0.010 to 0.35 wt %; and wherein each (E) second antioxidant independently is (a) from 0.01 to 0.2 wt %; or (b) from 0.01 to 0.10 wt %; wherein all wt % based on total weight of the peroxide-curable polyolefin composition and the combined weight of the (D) to (K) is from >0.01 to 4.69 wt % of the total weight of the peroxide-curable polyolefin composition.

6. A peroxide-cured polyolefin product that is a reaction product of curing the peroxide-curable polyolefin composition of claim 1 to give the peroxide-cured polyolefin product.

7. A manufactured article comprising a shaped form of the peroxide-cured polyolefin product of claim 6.

8. A coated conductor comprising a conductive core and an insulation layer at least partially covering the conductive core, wherein at least a portion of the insulation layer comprises the peroxide-cured polyolefin product of claim 6.

9. A method of conducting electricity, the method comprising applying a voltage across the conductive core of the coated conductor of claim 8 so as to generate a flow of electricity through the conductive core.

* * * * *